US012131200B2

(12) United States Patent
Shveidel et al.

(10) Patent No.: US 12,131,200 B2
(45) Date of Patent: Oct. 29, 2024

(54) BALANCED WINNER ASSIGNMENT FOR DEADLOCK RESOLUTION

(71) Applicant: EMC IP Holding Company LLC, Hopkinton, MA (US)

(72) Inventors: Vladimir Shveidel, Pardes-Hana (IL); Amitai Alkalay, Kadima (IL); Bar David, Rishon Lezion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/364,937

(22) Filed: Jul. 1, 2021

(65) Prior Publication Data

US 2023/0004448 A1 Jan. 5, 2023

(51) Int. Cl.
*G06F 9/52* (2006.01)
*G06F 9/46* (2006.01)

(52) U.S. Cl.
CPC .............. *G06F 9/524* (2013.01); *G06F 9/466* (2013.01)

(58) Field of Classification Search
CPC .... G06F 9/5038; G06F 9/3836; G06F 9/4887; G06F 9/52; G06F 9/524; G06F 9/466
See application file for complete search history.

(56) References Cited

U.S. PATENT DOCUMENTS 5,845,117 A * 12/1998 Fujita ................. G06F 9/466 718/107
9,933,947 B1 * 4/2018 Vokaliga ............... G06F 3/0683
(Continued)

FOREIGN PATENT DOCUMENTS

CN 109981468 A * 7/2019

OTHER PUBLICATIONS

Nat Clearing Center the Peoples Bank of China, CN109981468A Description Translation, Jul. 5, 2019, [database online], [retrieved on Sep. 28, 2022] Retrieved from Espacenet using Internet <URL:https://worldwide.espacenet.com/patent/search/family/067081850/publication/CN109981468A?q=CN%20109981468%20B>, pp. 1-18 (Year: 2019).*

(Continued)

*Primary Examiner* — Meng T An
*Assistant Examiner* — Hsing Chun Lin
(74) *Attorney, Agent, or Firm* — Muirhead and Saturnelli, LLC

(57) ABSTRACT

Processing may be performed in accordance with a policy to assign roles of winner and loser between two nodes. The roles may be used in connection with deadlock resolution processing. A deadlock or potential deadlock may be detected between the two nodes performing processing for two transactions In response to detecting the deadlock or potential deadlock, using a current state may be used to determine whether to perform the deadlock resolution processing to resolve the deadlock or potential deadlock. The current state may indicate whether assignment of the winner and loser roles between the two nodes is in progress. Responsive to the current state indicating that processing is not in progress to assign roles of winner and loser between the two nodes, the current state may be used perform deadlock resolution processing to resolve the deadlock or potential deadlock. The current state may denote which node is the current winner.

19 Claims, 7 Drawing Sheets

(56) References Cited

U.S. PATENT DOCUMENTS

| | | | | |
|---|---|---|---|---|
| 2012/0089735 | A1* | 4/2012 | Attaluri | G06F 9/5038 |
| | | | | 709/226 |
| 2014/0115604 | A1* | 4/2014 | Gottschlich | G06F 9/3861 |
| | | | | 718/106 |
| 2015/0089509 | A1* | 3/2015 | Brown | G06F 11/14 |
| | | | | 718/103 |
| 2017/0090814 | A1* | 3/2017 | Yeung | G06F 3/0673 |
| 2018/0329945 | A1* | 11/2018 | Horii | G06F 16/2379 |
| 2022/0109604 | A1* | 4/2022 | Suryanarayanarao | |
| | | | | H04W 40/24 |

OTHER PUBLICATIONS

U.S. Appl. No. 17/243,252, filed Apr. 28, 2021, "System and Method for Consistent Metadata Access Based on Local Locks Semantics in a Multi-Node Cluster," (123709.01).

U.S. Appl. No. 17/368,087, filed Jul. 6, 2021, "N-Way Active-Active Storage Configuration Techniques," (124274.01).

\* cited by examiner

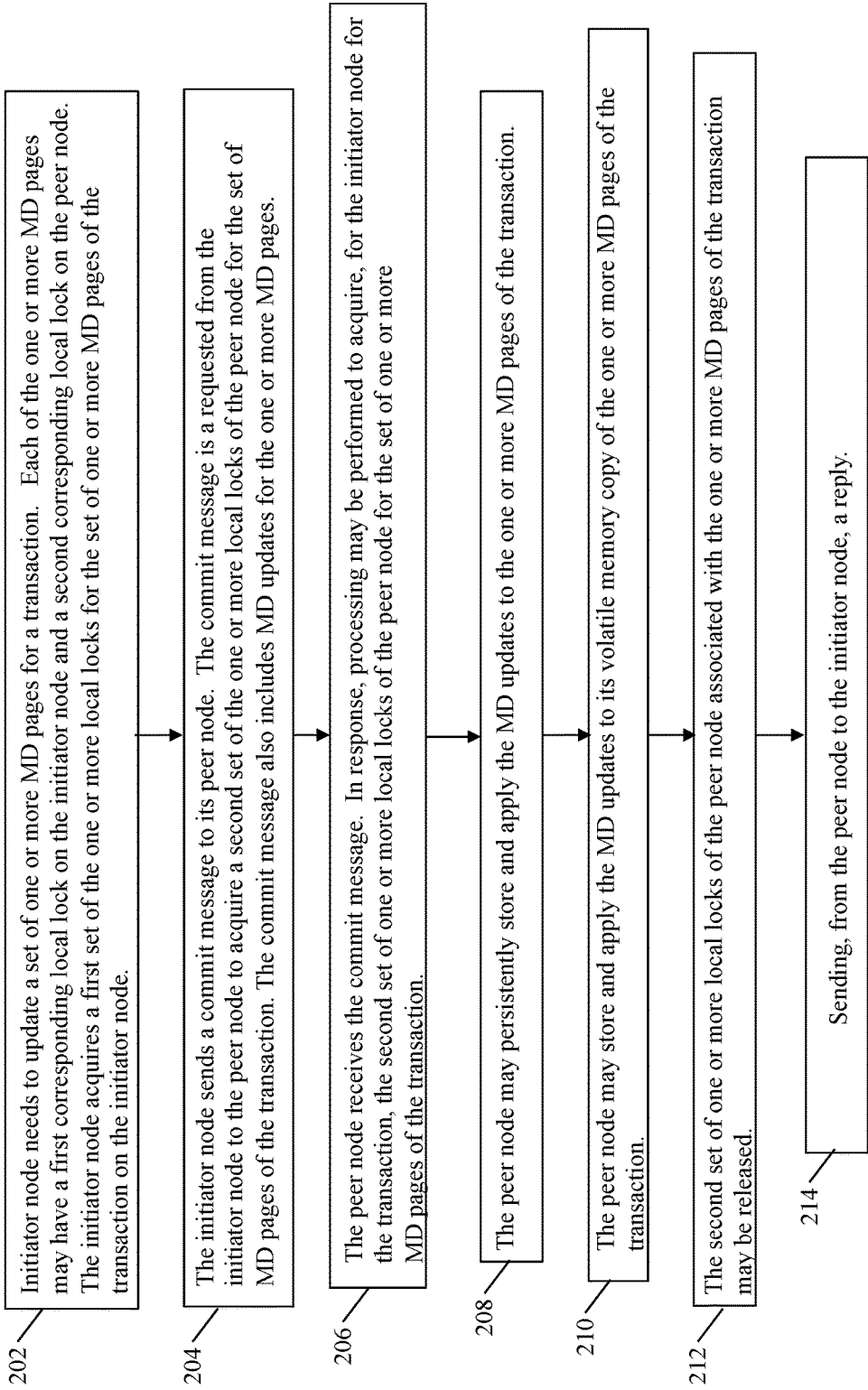

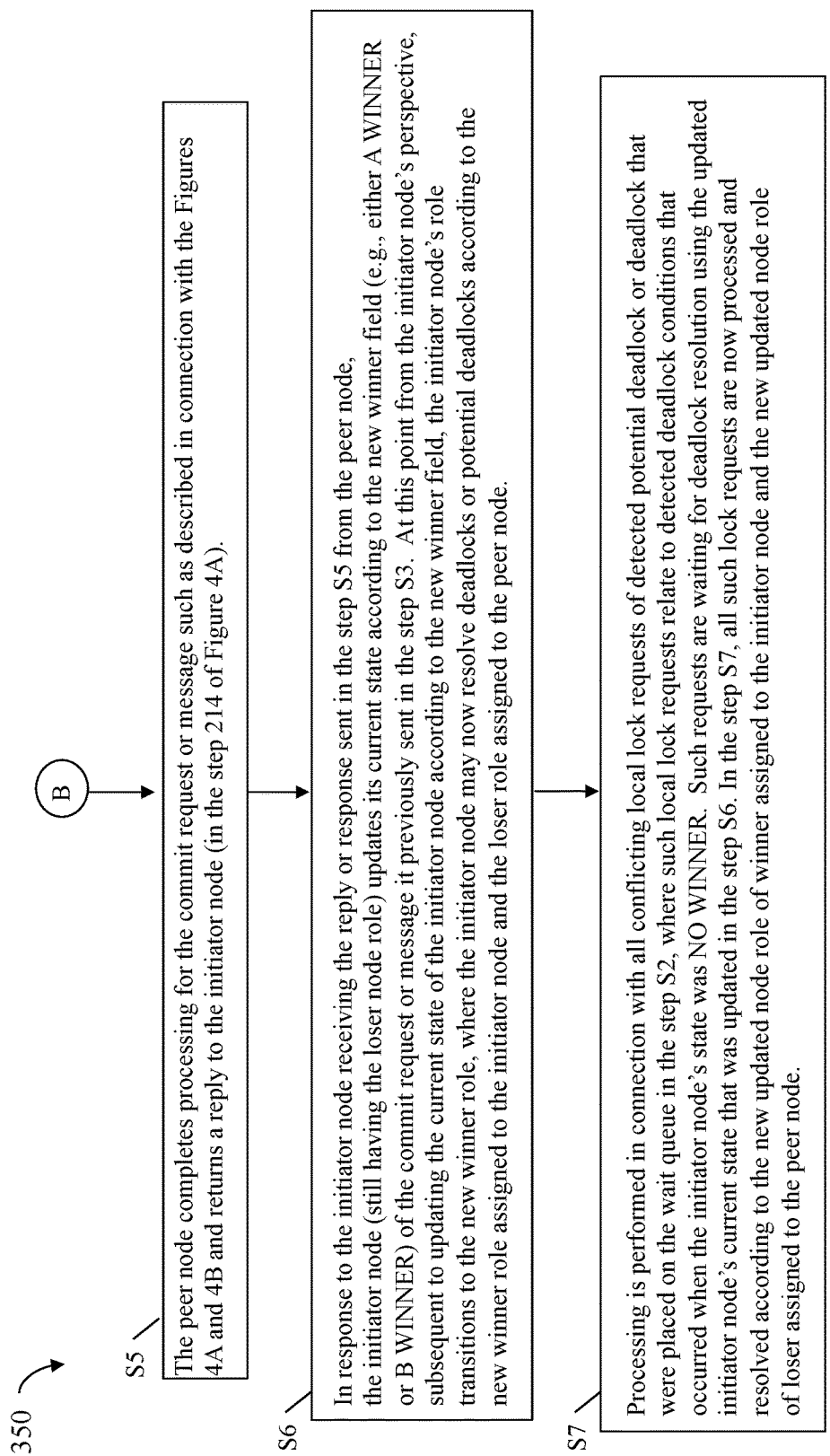

BALANCED WINNER ASSIGNMENT FOR DEADLOCK RESOLUTION

BACKGROUND

Technical Field

This application generally relates to data storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for comprising: performing first processing in accordance with one or more policies to assign a winner role and a loser role between a first node and a second node, wherein current assignments of the winner role and the loser role among the first node and the second node are used in connection with deadlock resolution processing; detecting a deadlock or potential deadlock between a first node performing processing for a first transaction and a second node performing processing for a second transaction; in response to detecting the deadlock or potential deadlock by the first node, using a first current state of the first node to determine whether to perform said deadlock resolution processing to resolve the deadlock or potential deadlock, wherein the first current state indicates whether the first processing is in progress whereby role assignment of the winner role and the loser role between the first node and the second node is in progress and not synchronized among the first node and second node; and responsive to the first current state indicating that the first processing is not in progress whereby role assignment of the winner role and the loser role between the first node and the second node is not in progress and is synchronized among the first node and second node, using the first current state of the first node to perform said deadlock resolution processing to resolve the deadlock or potential deadlock detected by the first node.

In at least one embodiment, the first current state may be any one of three predetermined states. The three predetermined states may include a first predetermined state indicating that the first node is currently assigned the winner role and the second node is currently assigned the loser role. The three predetermined states may include a second predetermined state indicating that the second node is currently assigned the winner role and the first node is currently assigned the loser role. The three predetermined states may include a third predetermined state indicating that the first processing is in progress whereby role assignment of the winner role and the loser role between the first node and the second node is in progress and not synchronized among the first node and second node.

In at least one embodiment, the first current state may have a first value denoting either the first predetermined state or the second predetermined state whereby the first current state denotes that the first processing is not in progress, role assignment of the winner role and the loser role between the first node and the second node is not in progress, and role assignment of the winner role and loser role is synchronized among the first node and second node, and wherein the method may include performing said deadlock resolution processing to resolve the deadlock or potential deadlock detected by the first node.

In at least one embodiment, the first current state may have a second value denoting the third predetermined state indicating that the first processing is in progress, role assignment of the winner role and the loser role between the first node and the second node is in progress, and role assignment of the winner role and loser role is not synchronized among the first node and second node, and wherein the method may include waiting to perform said deadlock resolution processing to resolve the deadlock or potential deadlock detected by the first node. Waiting to perform the deadlock resolution processing may include placing a first conflicting lock request on a first queue. The first conflicting lock request may be between the first transaction and the second transaction. Responsive to the first current state transitioning from the second value denoting the third predetermined state to another value denoting either the first predetermined state or the second predetermined state, the first current state of the first node may be used to perform deadlock resolution processing to resolve the deadlock or potential deadlock detected by the first node.

In at least one embodiment, servicing each of the first transaction and the second transaction may include updating a set of one or more metadata (MD) pages. Servicing the first transaction may include acquiring exclusive access to a first MD page. Servicing the first transaction may include: acquiring a first local lock of the first node for a first MD page; and acquiring a second local lock of the second node for a first MD page. Servicing the second transaction may include acquiring exclusive access to the first MD page. Servicing the second transaction may include: acquiring the first local lock of the first node for a first MD page; and acquiring the second local lock of the second node for a first MD page. At a first point in time, the first local lock of the first node for the first MD page may be held by the first node, the second local lock of the second node for the first MD page may be held by the second node, the second node may have requested but not yet acquired the first local lock of the first node for the first MD page, and the first node may have requested but not yet acquired the second local lock of the second node for the first MD page. The first node may detect the deadlock or potential deadlock at the first point in time in response to the first node receiving a request from the second node for the first local lock of the first node for the first MD page while the first node holds the first local lock for the first MD page and while the first node also has an outstanding request for the second local lock of the second node for the first MD page.

In at least one embodiment, performing the first processing in accordance with one or more policies to assign a winner role and a loser role between a first node and a second node may be initiated by one of the first node and the second node currently assigned the loser role when the current one is also an initiator servicing a transaction. The first processing may include the one node sending, to the other of the first node and the second node, a new winner value indicating that the one node is transitioning from the loser role to the winner role, and indicating that the other of the first node and the second node is transitioning form the winner role to the loser role. The one or more policies may include a first policy indicating to periodically performing the first processing to assign a winner role and a loser role between a first node and a second node. The first policy may indicate to perform the first processing at any of: each occurrence of a defined time interval, and each time a specified number of transactions is processed collectively by the first node and the second node.

BRIEF DESCRIPTION OF THE DRAWINGS

Features and advantages of the present invention will become more apparent from the following detailed description of exemplary embodiments thereof taken in conjunction with the accompanying drawings in which:

FIGS. 4A, 4B, 5A and 5B are flowcharts of processing steps that may be performed in an embodiment in accordance with the techniques herein.

DETAILED DESCRIPTION OF EMBODIMENT(S)

Figure 1:
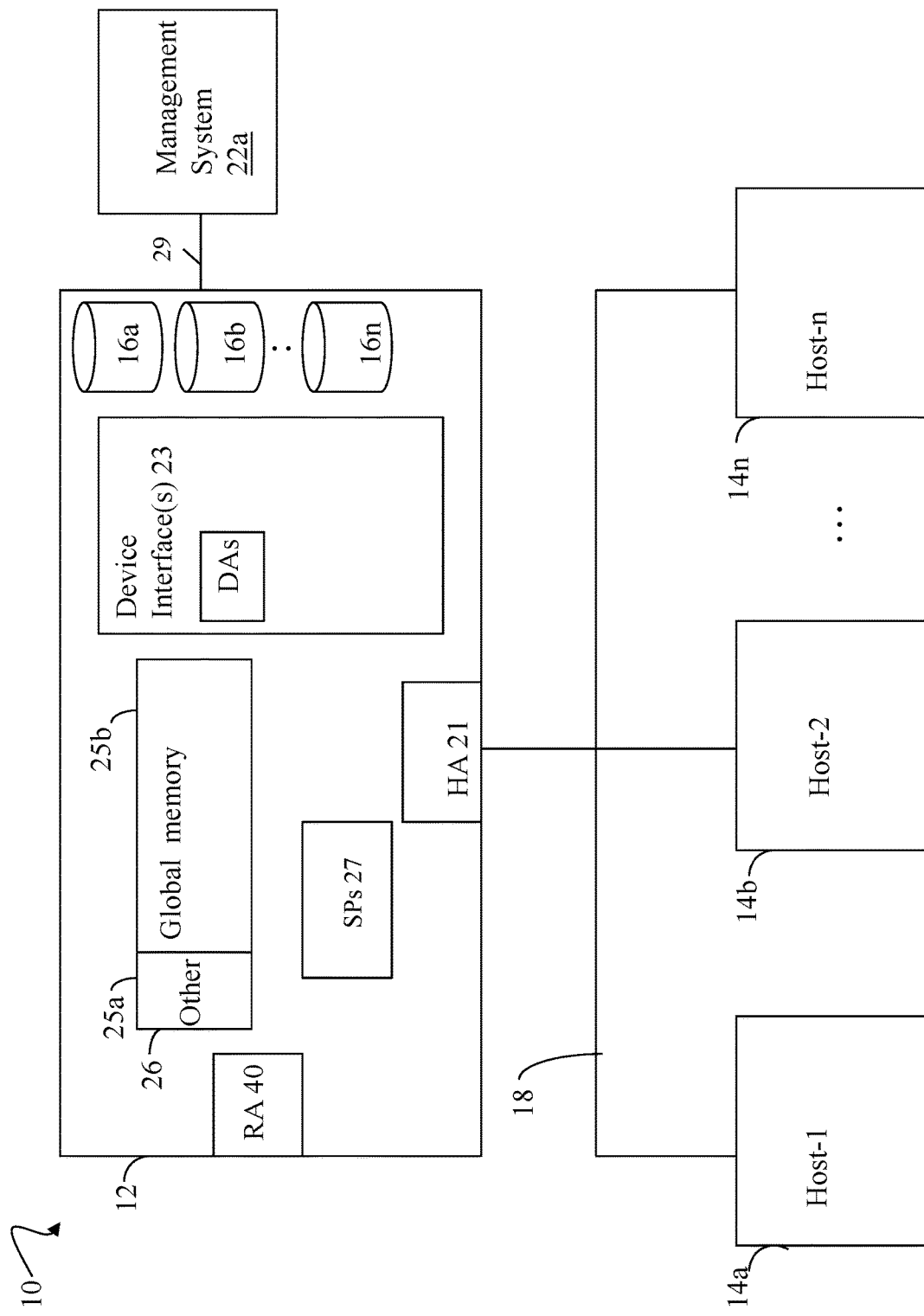
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different controllers or adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on the management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
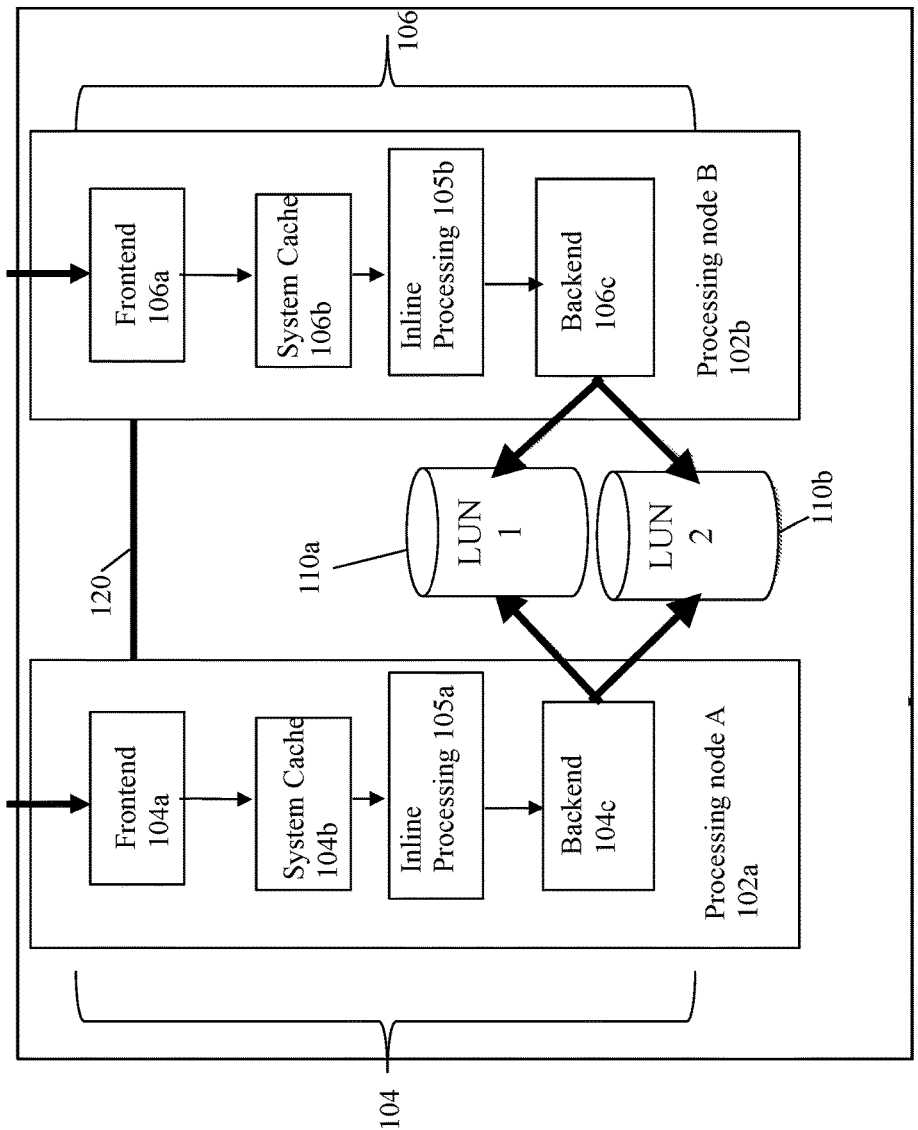
FIG. 2 is an example illustrating the I/O path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one or more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data deduplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage such as BE PDs providing non-volatile storage. For example, in at least one embodiment, a RAM based memory may be one of the caching layers used as to cache the write data that is then flushed to the backend physical storage. When the processor performs processing, such as in connection with the inline processing 105a, 105b as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102a-b in the FIG. 2. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by code executing on the one or more processors of each node. Each node of the pair may include its own resources such as its own local (i.e., used only by the node) resources such as local processor(s), local memory, and the like.

Consistent with other discussion herein, a cache may be used for caching write I/O data and other cached information. The other cached information may include, for example, cached operations or commands such as create snapshot commands. In one system, the cache may be implemented using multiple caching devices or PDs, such as non-volatile (NV) SSDs such as NVRAM devices that are external with respect to both of the nodes or storage controllers. The caching devices or PDs used to implement the cache may be configured in a RAID group of any suitable RAID level for data protection. The caching PDs form a shared cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein.

In the following paragraphs, the one or more caching devices or PDs may be referred to as a data journal or log used in the data storage system. In such a system, the caching devices or PDs are non-volatile log devices or PDs upon which the log is persistently stored.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log file may be used to optimize write operation latency. Generally, a write operation writing data is received by the data storage system from a host or other client. The data storage system then performs processing to persistently record the write operation in the log. Once the write operation is persistently recorded in the log, the data storage system may send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed may now be reclaimed for reuse.

It should be noted that the flushing of the log may be performed in response to an occurrence of any one or more defined conditions. For example, the log may be flushed in response to determining that the amount of reclaimed log space available for use and allocation is less than a specified threshold amount or size.

In at least one embodiment, a metadata (MD) structure of mapping information that may be used in accordance with the techniques herein.

The mapping information may be used, for example, to map a logical address, such as a LUN and an LBA or offset, to its corresponding storage location, such as a physical storage location on BE non-volatile PDs of the system. Consistent with discussion elsewhere herein, write requests or operations stored in the log may be flushed to the BE PDs (non-volatile) providing storage locations for the written data. For example, a logged write operation that writes first data to a logical address may be flushed whereby the logged first data is written out to a physical storage location on a BE PD. The mapping information may be used to map the logical address to the physical storage location containing the content or data stored at the logical address. In at least one embodiment, the mapping information may include a MD structure that is hierarchical structure of multiple layers.

Figure 3:
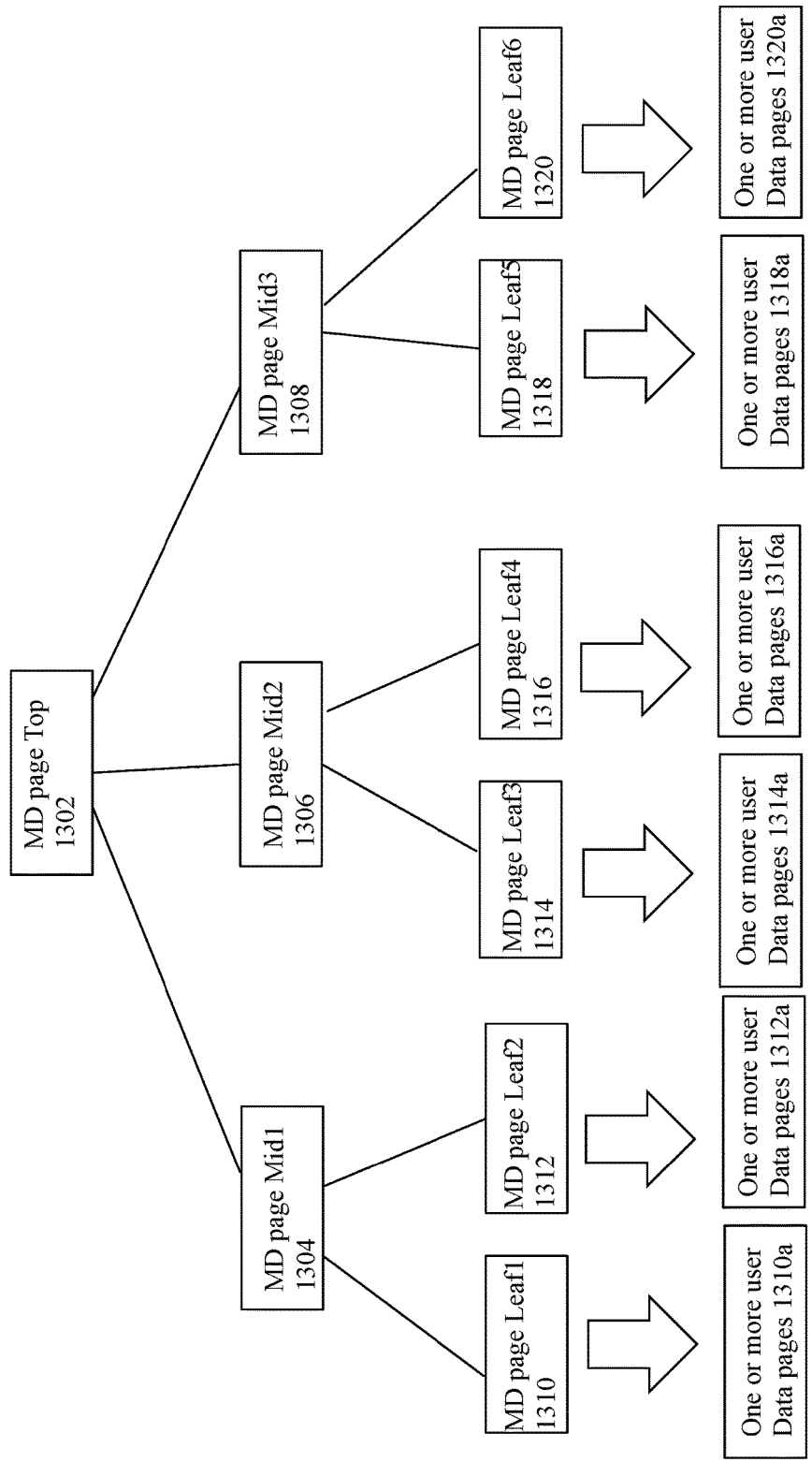
FIG. 3 is an example of mapping information in the form of a metadata structure that may be used in connection with mapping logical addresses to physical addresses or storage locations in at least one embodiment in accordance with the techniques herein.

In at least one embodiment, the mapping structure for a LUN, such as a LUN A, may be in the form of a tree having a plurality of levels of MD pages. More generally, the mapping structure may be in the form of any ordered list or hierarchical structure. In at least one embodiment, the mapping structure for the LUN A may include LUN MD in the form of a tree having 3 levels including a single top or root node (TOP node), a single mid-level (MID node) and a bottom level of leaf nodes (LEAF nodes), where each of the MD page leaf nodes may point to, or reference (directly or indirectly) one or more pages of stored data, such as user data stored on the LUN A. Each node in the tree may correspond to a MD page including MD for the LUN A. More generally, the tree or other hierarchical structure of various MD pages of the mapping structure for the LUN A may include any suitable number of levels, such as more than 3 levels where there are multiple mid-levels. In at least one embodiment the tree of MD pages for the LUN may be a B+ tree, also sometimes referred to as an "N-ary" tree, where "N" indicates that each node in the tree structure may have up to a maximum of N child nodes. For example, in at least one embodiment, the tree of MD pages for the LUN may specify N=512 whereby each node in the tree structure may have up to a maximum of N child nodes. For simplicity of illustration, the tree structure of MD pages, corresponding to the mapping structure in at least one embodiment, is represented in FIG. 3 as including only 3 levels where each node in the tree may have at most 3 child nodes. Generally, the techniques herein may be used with any layered or hierarchical structure of MD pages.

Referring to FIG. 3, shown is an example 1300 of a tree of MD pages that may be used in an embodiment in accordance with the techniques herein. The example 1300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 1300, the top or root level, level 1, includes MD page 1302; the mid or middle level, level 2, includes MD pages 1304, 1306 and 1308; and the bottom level, level 3, includes MD pages 1310, 1312, 1314, 1316, 1318 and 1320, which may also be referred to as leaf nodes. As also illustrated in the example 1300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 1310, 1312, 1314, 1316, 1318 and 1320 point or reference, respectively, one or more UD pages 1310a, 1312a, 1314a, 1316a, 1318a and 1320a.

The links or connections between a parent node (at level M) and its one or more child nodes (at level M+1) in the tree 1300 generally represent mappings between the parent node and the one or more child nodes. In at least one embodiment, the parent node may include a reference used to access (directly or indirectly) each of its one or more child nodes. For example, the root node MD page top 1302 may include addresses or pointers used to access each of its child nodes 1304, 1306 and 1308. The mid-level node MD page mid1 1304 may include addresses or pointers used to access each of its child leaf nodes 1310, 1312. The mid-level node MD page mid1 1306 may include addresses or pointers used to access each of its child leaf nodes 1314, 1316. The mid-level node MD page mid1 1308 may include addresses or pointers used to access each of its child leaf nodes 1318, 1320.

In at least one embodiment, each of the addresses or pointers included in a MD page that references a location in another MD page or references a location in a UD page may be a physical storage location on the back-end PDs. Thus, the traversal between connected nodes of the structure 1300 may correspond to traversing physical address or storage locations included in pages or nodes that are parent nodes.

In connection with accessing a particular UD page in at least one embodiment, all MD pages in a path from the root or top level of the tree to the UD page may be required to be traversed in a consecutive serialized order in which such pages appear in the path traversal down the path from the top or root level to the UD page accessed using a particular one of the MD page leaf nodes. For example, assume UD page or block X is included in the set of UD pages 1312a. In order to access UD page X of 1312a, the following denotes the consecutive serialized order in which the MD pages forming a sequence are accessed: MD page top 1302, MD page mid1 1304, and MD page leaf2 1312. Generally, in at least one embodiment, each of the MD pages may include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 1302, MD page mid1 1304, and MD page leaf2 1312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 1300 may generally include multiple pointers or references to locations of its child nodes or pages. For example, MD page top 1302 includes pointers to locations of its child nodes, MD pages 1304, 1306 and 1308. MD page mid2 1306 includes pointers to locations of its child nodes, MD pages 1314 and 1316.

The data pages 1310*a*, 1312*a*, 1314*a*, 1316*a*, 1318*a* and 1320*a* include UD stored on particular logical addresses of a LUN's address space, such as the LUN A's logical address space. In at least one embodiment each MD leaf may hold MD for a specified number of LBAs of a LUN. For example, in one embodiment each MD leaf may hold MD for 512 LBAs. For example, with reference to FIG. 3, the data pages 1310*a*, 1312*a*, 1314*a*, 1316*a*, 1318*a* and 1320 each include user data stored on particular logical addresses of the LUN A's logical address space. It may be, for example, that element 1310*a* includes user data stored at a first set of LBAs 0-511; and that element 1312*a* includes user data stored at a second set of LBAs 512-1023. Generally, the particular LBAs of the LUN mapped to each MD page may vary with embodiment. For example, in at least one embodiment, consecutive sequential subranges of the LUN's logical address space may be mapped to the MD page leaves. Additionally, when the tree is traversed in a depth first manner, the MD page leaves may correspond to consecutive sequential subranges. For example, the element 1310*a* denotes data pages for LBAs 0-511; the element 1312*a* denotes data pages for the LBAs 512-1023; the element 1314*a* denotes data pages for LBAs 1024-1535; the element 1316*a* denotes data pages for LBAs 1536-2047, and so on.

In at least one embodiment, when the structure 1300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 1302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 1300 may be of a predetermined size and each of the MD pages may hold a known number of entries containing pointer or address values. In such a case and in combination with the correspondence of sequential consecutive LBA ranges of each MD leaf page, an embodiment may perform a calculation to determine the MD page at a particular level that is accessed in the tree MD mapping structure 1300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 1300 may be known to include MD relevant for accessing data on a particular LUN and one or more LBAs of that LUN. For example, consistent with discussion above, element 310*a* denotes the data blocks for LBAs 0-511 of a LUN. In order to access the data block for an LBA of the LUN in the LBA subrange 0-511, MD pages 1302, 1304 and 1310 may be traversed in sequential order. In particular, the first entry or offset of the MD page top 1302 may contain the address of the MD page mid 1 1304; the first entry or offset of the MD page mid 1 1304 may contain the address of the MD page leaf 1 1310; and the first entry or offset of the MD page leaf 1 1310 may contain the address of the data blocks for 1310*a*.

In a similar manner, a mapping may be made regarding what MD pages of the structure 300 and entries thereof are used in connection with obtaining data blocks containing data for any particular LUN and LBA. In at least one embodiment, the particular MD pages used to access a data block including data for a particular LUN and LBA may be known based on such mappings and correspondence of LBA subranges to particular MD leaf pages.

For a write I/O operation received at a node of a dual node system or appliance such as in an active-active configuration, servicing the write operation may include updating one or more data blocks or storage locations as well as one or more MD pages such as, for example, of the MD or mapping structure of FIG. 3. In at least one embodiment, the MD or mapping information used in connection with stored user data may be stored on non-volatile storage, such as on the BE PDs of the appliance or data storage system. At least some of the MD or mapping information for all such user data may be stored in a volatile memory cache of each of the nodes of the appliance or system. Depending on the write operation, one or more logical addresses may be updated with new data or content by a write operation. Additionally, one or more MD pages used to map the one or more logical addresses to one or more physical storage locations storing the new data may also be updated, for example, to reference the one or more physical storage location including the new data or content.

With a log-structured system in at least one embodiment, as recorded writes of the log are processed and flushed to the BE PDs, the content written by the recorded writes of the log may be stored at physical storage locations on the BE PDs. Additionally, the MD or mapping information corresponding to the logged writes being flushed may also be accordingly updated to reference the physical storage locations on the BE PDs containing the content. In a dual node appliance or system with an active-active configuration as described herein, both nodes of the system may concurrently receive and service write I/Os, as well as other received requests and commands using shared resources such as, for example, the MD or mapping information described in connection with FIG. 3.

In connection with an active-active appliance or system such as described herein, the nodes should be synchronized to guarantee consistent access and updates of the same data and MD objects or MD pages from both nodes. Schema providing MD consistency, integrity and coherency may use global transactional update semantics (e.g., providing for coherent synchronized updates on both nodes) and global locking semantics. A classical problem that may occur in connection with the active-active architecture of the dual node appliance is deadlock or a potential for deadlock in the case where, for example, both nodes of the appliance initiate an update for the same one or more objects or pages, such as the same one or more MD pages, concurrently. A deadlock is a situation in which two processes, threads, programs or other code entities sharing the same resource are effectively preventing each other from accessing the resource, resulting in blocking execution of both processes, threads, programs or other code entities. For example, process 1 needs both resources A and B to continue execution. Additionally, process 2 also needs both resources A and B to continue execution. Process 1 requests and receives resource A. Process 2 requests and receives resource B. Process 1, while holding resource A, now requests resource B but is blocked since resource B is currently held by process 2. In a similar manner, process 2, while holding resource B, now requests resource A but is blocked since resource A is currently held by process 1. In the foregoing, a deadlock may be detected between both process 1 and process 2. More generally, the potential for deadlock may occur in connection with any scenario where two consumers are both attempting to acquire the same one or more shared resources and each of the two consumers have a mutual dependency on each other and hold a shared resource the other needs to proceed.

One existing technique for resolving a detected deadlock or potential deadlock such as with two nodes of the dual node appliance that are in a deadlock scenario includes permanently assigning a fixed, dedicated winner node and permanently assigning a fixed dedicated loser node. In this solution, a first node of the two nodes may be permanently selected and assigned as the fixed predetermined winner and a second of the two nodes may be permanently selected and assigned as the fixed predetermined loser. In response to a detected deadlock or potential deadlock, the loser node always aborts or releases any resources held that are causing the deadlock. In response to a detected deadlock or potential deadlock, the winner node is always allowed to continue processing and subsequently acquires the resources released by the loser node.

However, the foregoing solution of fixed permanent dedicated assignments of the node roles of winner and loser to particular nodes has drawbacks. For example, always having one of the nodes be a winner and always having the other node be the loser provides for node asymmetry that may result in a load imbalance between the nodes. Additionally, there is a fairness issue in that the same winner node is always allowed to proceed for a detected deadlock and given priority over the other loser node. In some instances, this could result in the loser node potentially being indefinitely blocked by the winner node. For example, in some instances, the loser node may be not be able to make any progress with a particular task, operation or transaction. Each time the loser node attempts to acquire a shared resource for the particular task, operation or transaction and a deadlock or potential deadlock is detected, the loser node may be forced to abort the particular task or operation, and release any shared resource currently held or acquired. Subsequently, the loser node may continually retry and repeat processing for the transaction, task or operation aborted. In contrast, the winner node (that conflicted with the loser node causing the detected potential deadlock) is allowed to always proceed and acquire any needed resources released by the aborted loser node. The adverse impact of both of the foregoing factors may increase as the system load increases thereby resulting in system performance degradation.

Described in the following paragraphs are techniques that may be used in connection with resolving a deadlock or potential deadlock in a system. The techniques described in the following paragraphs provide a balanced and fair approach to break and resolve any detected deadlock. In accordance with the techniques herein in at least one embodiment, roles of winner and loser may be assigned to the nodes in a balanced manner that minimize the adverse results noted above that may be introduced by having fixed permanent dedicated assignments of the node roles of winner and loser.

It should be noted that balanced switching of the winner and loser roles between the nodes is not a trivial task. For example, the decision at a point in time of which node is the winner and which is the loser may not be done per object or page since a completing a transaction may require acquiring exclusive access to multiple resources such by acquiring and simultaneously holding multiple locks for the multiple resources. In this case, multiple resources required for a transaction to complete should be resolved at the transaction level uniformly whereby the same node is assigned the role of winner or loser with respect to all resources required for the transaction. Additionally, the same shared resource may be involved in two different transactions.

In the following paragraphs, reference may be made to a particular method or protocol used in connection with performing MD updates to one or more MD pages. The MD pages may be, for example, like the MD pages of the mapping information or structure of FIG. 3. More generally, the techniques described herein may be used in connection with any suitable protocol and shared resource(s) requiring synchronized exclusive access between multiple consumers. One particular method or protocol used in connection with performing MD updates to one or more MD pages is described in some detail herein and in further detail, for example, in U.S. application Ser. No. 17/243,252, filed on Apr. 28, 2021, "System and Method for Consistent Metadata Access Based on Local Locks Semantics in a Multi-Node Cluster", Shveidel, et al., (the '252 application) which is incorporated by reference herein in its entirety.

The '252 application uses a technique to synchronize access to shared MD pages among the two nodes of an appliance by combining locking and transactional update logic using a single round or message exchange between the two nodes. However, as discussed in the '252 application and also in the following paragraphs, such a technique may also result in deadlock or potential deadlock. Also discussed in the following paragraphs is a technique that may be used to break or resolve the detected deadlock or potential deadlock between the two nodes with respect to both nodes attempting concurrently to acquire exclusive access to a same MD page.

Figure 4B:
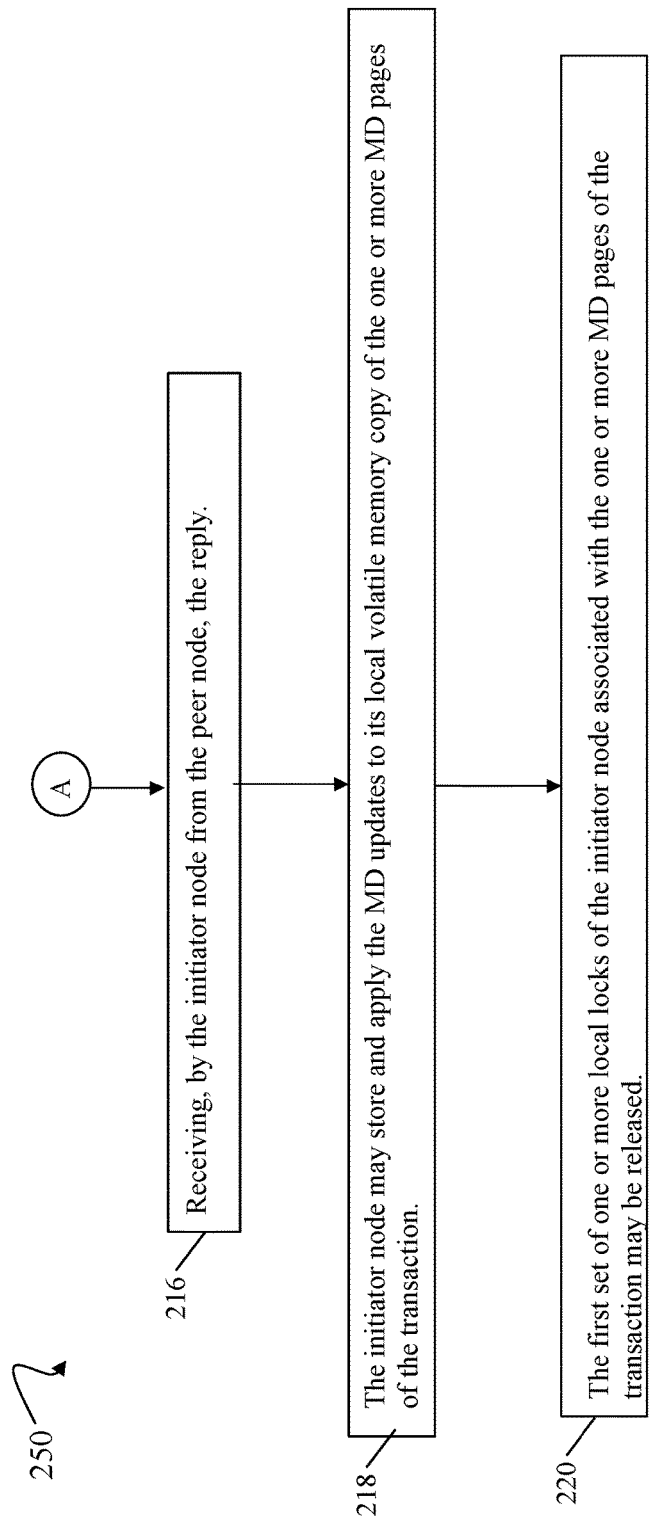

What will now be described is processing that may be performed in connection with two nodes of the dual node appliance to synchronize access to one or more MD pages involved in a transaction. Thus, in this context and example described in the following paragraphs, all of the one or more MD pages may be required to perform the updates of the transaction initiated by an initiator. The processing described herein, such as in connection with FIGS. 4A and 4B, is a somewhat generalized version of that described in the '252 application. However, more generally the techniques described herein may be applied for use in connection with any detected deadlock in connection with a protocol with one or more phases or message exchanges.

The flowchart of FIGS. 4A and 4B generally describes processing in which an initiator node (sometimes referred to simply as initiator) needs to perform updates on a set of one or more MD pages. Consistent with the '252 application, the flowchart of FIGS. 4A and 4B provides an efficient "local" MD page lock semantics and schema. Specifically, the initiator node and its peer node (sometimes referred to simply as a peer) may each have their own local locks for MD pages accessible to both nodes. A request by an initiator node for the local lock for a MD page on the initiator node is a request for exclusive access to the MD page that is node local (e.g., within the scope of the initiator node). A request by an initiator node for the local lock for a MD page on the it's peer node is a request for exclusive access to the MD page that is node local (e.g., within the scope of the node).

Thus local locks of one node may be acquired separately with no dedicated internode lock synchronization between nodes. For each MD page, the initiator node may have a first corresponding local lock and the peer node may have a second corresponding local lock. An initiator node that needs to apply an update to a particular MD page and requires exclusive access to the particular MD page must acquire the first local lock of the initiator node for the particular MD page and also acquire the second local lock of the peer node for the particular MD page prior to applying the update. Once the initiator node has acquired the local lock of the initiator node for the MD page and the local lock of the peer node for the MD page, the initiator node has exclusive access to the MD page and the update may be applied to the MD page. Once the update to the MD page has been applied, the local locks of the initiator node and the peer node previously acquired for the MD page may be released.

The local lock for a MD page may be characterized as local with respect to a single node for the MD page and may be used to provide lock semantics and serialization of access in the scope of only the single node. Thus, in order for a node in a dual node appliance to acquire exclusive access to a MD page, the node needs to acquire a first local lock for the MD page from a first of the two nodes and also acquire a second local lock for the MD page from the remaining node (e.g., a second of the two nodes).

Referring to FIGS. 4A and 4B, shown is a flowchart of processing steps that may be performed in an embodiment in accordance with the techniques herein. Consistent with other discussion herein, the FIGS. 4A and 4B describe processing that may be performed in connection with one particular protocol of the '252 application using a single round of message-reply exchange between an initiator node and its peer node when the initiator node performs processing to service a transaction and apply updates to one or more MD pages of the transaction.

At the step 202, the initiator node needs to update a set of one or more MD pages for a transaction. Each of the one or more MD pages may have a first corresponding local lock on the initiator node and a second corresponding local lock on the peer node. In the step 202, the initiator node acquires a first set of the one or more local locks for the set of one or more MD pages of the transaction on the initiator node. From the step 202, control proceeds to the step 204.

At the step 204, the initiator node sends a commit message to its peer node. The commit message is a request from the initiator node to the peer node to acquire a second set of the one or more local locks of the peer node for the set of MD pages of the transaction. The commit message in this protocol illustrated also includes, as a commit message payload, the MD updates for the one or more MD pages. From the step 204, control proceeds to the step 206.

At the step 206, the peer node receives the commit message. In response, processing may be performed to acquire, for the initiator node for the transaction, the second set of one or more local locks of the peer node for the set of one or more MD pages of the transaction. From the step 206, control proceeds to the step 208.

At the step 208, the peer node may persistently store and apply the MD updates to the one or more MD pages of the transaction. From the step 208, control proceeds to the step 210.

At the step 210, the peer node may store and apply the MD updates to its volatile memory copy of the one or more MD pages of the transaction. From the step 210, control proceeds to the step 212.

At the step 212, the second set of one or more local locks of the peer node that are associated with the one or more MD pages of the transaction may be released. From the step 212, control proceeds to the step 214.

At the step 214, a reply message may be sent from the peer node to the initiator node indicating completion of the commit processing by the peer node. From the step 214, control proceeds to the step 216.

At the step 216, the initiator node receives the reply from the peer node. From the step 216, control proceeds to the step 218.

At the step 218, the initiator node may store and apply the MD updates to its local volatile memory copy of the one or more MD pages of the transaction. From the step 218, control proceeds to the step 220.

At the step 220, the first set of one or more local locks of the initiator node associated with the one or more MD pages of the transaction may be released.

In connection with a local lock requested by an initiator node, such as in connection with the steps 202 and 206, if the requested local lock for a MD page is not available and is currently held by a node in connection with another transaction, processing for the request by the initiator may be blocked and wait in a queue associated with the local lock. In at least one embodiment, if there are multiple requests for multiple transactions blocked and waiting for the local lock, the multiple requests may be placed in the queue in a FIFO (first in first out) order in accordance with the time order in which the multiple requests attempted to acquire the local lock. In response to releasing the local lock of the FIFO queue, a next waiting request, if any, from the queue may proceed to attempt to acquire the local lock of the peer node for the transaction associated with the next waiting request. For example, such a queue as just described may be used in connection each local lock of an initiator node when attempting to acquire its own one or more local locks for one or more MD pages of the transaction in the step 202. Additionally, such a queue as just described may be used in connection each local lock of a peer node when attempting to acquire, on behalf of the commit request from the initiator node for a transaction, one or more local locks of the peer node for the one or more MD pages of the initiator's transaction in the step 206.

In connection with the processing of FIGS. 4A and 4B, a peer node receiving a commit request in connection with the step 206 may detect a deadlock or potential deadlock. In particular, the commit request may request the peer node's local lock for a first MD page X1 for first transaction of the initiator node. The peer node may determine that its local lock for the first MD page X1 is already locked or taken in connection with a different transaction. For example, the peer node may determine that it has taken its local lock for the first MD page X1 in connection with a different transaction. Additionally, the peer node may detect that there is also an outstanding commit request in which the peer node previously requested a local lock of the initiator node for the same first MD page X1 for the different transaction. The outstanding commit request may have been previously sent from the current peer node to the current initiator node (e.g., when the current peer node previously assumed the role of initiator and the current initiator previously assumed the role of peer in connection with requesting MD pages for the different transaction) and the current initiator node has not yet returned a reply. The peer node may detect a potential deadlock in that both nodes are concurrently attempting to acquire exclusive access to the same MD page X1 from both nodes in connection with different transactions.

What will now be described is processing that may be performed in response to detecting a deadlock or a potential deadlock. As described above, in at least one embodiment, a deadlock may occur if it is determined that both nodes are attempting to update the same MD page concurrently. As noted above in at least one embodiment, the deadlock condition may be detected in response to a first node holding a first local lock on a MD page X2 and being blocked or waiting to acquire a second lock on the same MD page X2, and where a second node holds the second lock on the same MD page X2 and the second node is blocked or waiting for the first lock on the same MD page X2.

The following paragraphs describe techniques that may be performed to resolve a deadlock or potential deadlock detected in an embodiment in accordance with the techniques herein. The following techniques may be characterized as defining one of the nodes to be a winner and the other node to be a loser. Once the winner and loser node roles are assigned, the concurrent update and deadlock may be resolved by having the winner or winning node proceed with processing even if the winner node waits on a queue for a local lock for a MD page. The loser or losing node aborts its current transaction that includes the conflicting one or more local locks for one or more MD pages. In particular, the loser node releases all acquired local locks for the conflicting transaction being aborted and then retries the update or transaction (e.g., may include rebuilding delta sets of MD changes and then repeating processing to attempt to acquire all necessary local locks of both nodes for all MD pages of the transaction). The winning node or winner is allowed to proceed and may, for example, wait on one or more queues for one or more locks held by the loser node. In response to the losing node releasing the conflicting one or more local locks, the winning node may proceed to acquire the one or more local locks just released by the losing node. The winning node then continues its processing while the loser node waits and subsequently attempts to retry the updating of the one or more MD pages for the transaction.

In at least one embodiment in accordance with the techniques, assigning or reassigning the roles of winner and loser between the two nodes may be performed periodically in an ongoing continuous manner. For example, switching or alternating the roles of winner and loser between the two nodes may be performed at each occurrence of a periodic time interval, and/or after each specified number of transactions. More generally, switching or alternating the roles of winner and loser between the two nodes may be performed in an ongoing manner in response to any one or more defined trigger events or conditions. The switching of the roles of winner and loser between the two nodes may be performed using the techniques herein to guarantee coherent and consistent views of the roles among the nodes.

In at least one embodiment, each node at any point in time may have a current state that is one of the following three (3) predetermined or predefined states used to characterize the current role assignment status where "A" and "B" refer to identifiers uniquely identifying each of the two nodes in the appliance:

1. A WINNER. In the case of deadlock or potential deadlock detection between the nodes A and B, resolution is made in favor of the node A. The node A is assigned the winner role and the peer node B is assigned the loser role. Specifically, node-A-initiated transaction continues processing despite counter commit lock request sent to the peer. The node-B-initiated transaction is aborted in case of detected deadlock or potential deadlock for one or more of the locks of the node B's initiated transaction.

2. B WINNER. In the case of deadlock or potential deadlock detection between the nodes A and B, resolution is made in favor of the node B. The node B is assigned the winner role and the node A is assigned the winner role. Specifically, the node-B-initiated transaction continues processing despite counter commit lock request sent to the peer. The node-A-initiated transaction is aborted in case of detected deadlock or potential deadlock for one or more of the locks of the node A's initiated transaction.

3. NO WINNER. This state mean that the system is in transition whereby switching or assigning the roles of winner and loser to the two nodes is in progress at the current time and the nodes have not yet completed role synchronization. If some deadlock or potential deadlock is detected and the state of the node is "NO WINNER", then the conflicting local lock request causing the deadlock or potential deadlock may temporarily block or wait in a wait queue and does not progress until the state is changed to a new winner denoting either A WINNER or B WINNER. Subsequently, blocked conflicting local lock requests on the wait queue may be processed and resolved according to the new winner assignment. As an alternative to having the conflicting lock request of a detected deadlock/potential deadlock wait in the wait queue until the node's state transition from NO WINNER to either A WINNER or B WINNER, an embodiment may alternatively abort the transaction associated with the conflicting request for the local lock. Aborting the transaction may be characterized as a safe alternative guaranteed to prevent and resolve deadlocks. However, aborting all such transactions when a deadlock or potential deadlock is detected may cause an excessive number of transaction aborts depending on the particular implementation.

In at least one embodiment, each of the two nodes A and B may store in its local volatile memory a current state or value denoting one of the above-noted three (3) states used to characterize the current role assignment status as viewed locally by the particular node. In connection with the role switching processing or algorithm described herein, processing is performed to switch and update the current state denoting the current role assignment of winner and loser among the two nodes as stored locally on each of the two nodes. A node's current value for the current state may be set to one of the three above-noted states denoting the current assignments of the winner and loser roles (e.g., when the state of a node is either A WINNER or B WINNER), or denoting that the current role assignment switching is in progress (e.g., when the state of a node is NO WINNER). The current value for the current state of a node may be continuously changed or switched using the role switching processing or algorithm described herein. In at least one embodiment, a node's current value for the current state may be used by the node when performing resolution of detected deadlocks. In the event that the node's current value for the current state is NO WINNER and the node has detected a deadlock/potential deadlock requiring resolution, the conflicting request determined to cause the potential deadlock/deadlock may be placed on a wait queue where resolution of the potential deadlock/deadlock occurs once the node's current state has transitioned to either A WINNER or B WINNER.

An initial role assignment of the winner role and the loser role are made between the two nodes A and B. In at least one embodiment, the node that was activated in the appliance first in time may be assigned the winner role with the remaining node subsequently assigned the role of loser (as soon as the remaining node is booted and active). Once both nodes A and B are active and the initial role assignment performed, processing may be performed to enable the role switching processing or algorithm described below. The role switching processing or algorithm may be performed in a continuous manner in response to each occurrence of any one or more defined trigger events or conditions as discussed elsewhere herein. For example consistent with other discussion herein, the role switching processing or algorithm may be performed in accordance with one or more defined policies specifying the one or more defined trigger events or conditions. For example, the role switching processing or algorithm may be performed periodically based on a defined time interval (e.g. every 0.5 seconds), and/or after processing is completed for a specified number of transactions (e.g., every 512 transactions received and processed by both nodes of the appliance collectively). In at least one embodiment, once enabled, the role switching processing or algorithm may continue to operate and switch the roles of winner and loser between the two nodes in accordance with the one or more defined policies specifying the one or more defined trigger events or conditions.

In at least one embodiment, the existing messaging exchange between an initiator node and its peer node may be used for role switching and synchronization of the role between the nodes. Consistent with other discussion herein, the initiator node may be the node that needs to update a set of one or more MD pages for a transaction and where the initiator node is therefore attempting to acquire one or more local locks of the initiator node for the one or more MD pages and to acquire one or more local locks of the peer node for the one or more MD pages. In at least one embodiment, an additional field, referred to herein as "new winner" may be added to the payload of the commit message or request sent in the step 204 of FIG. 4A from the initiator node to the peer node. Normally, the value of the new winner field may be set to NONE to denote that no role switching action is requested. Alternatively, the value of the new winner field of the commit message or request sent in the step 204 may be set to either A WINNER or B WINNER to initiate or request performing the role switching processing or algorithm. In this manner, the current loser node may initiate the role switching processing or algorithm when the loser node is also an initiator node that needs to update a set of one or more MD pages for a transaction.

Figure 5A:
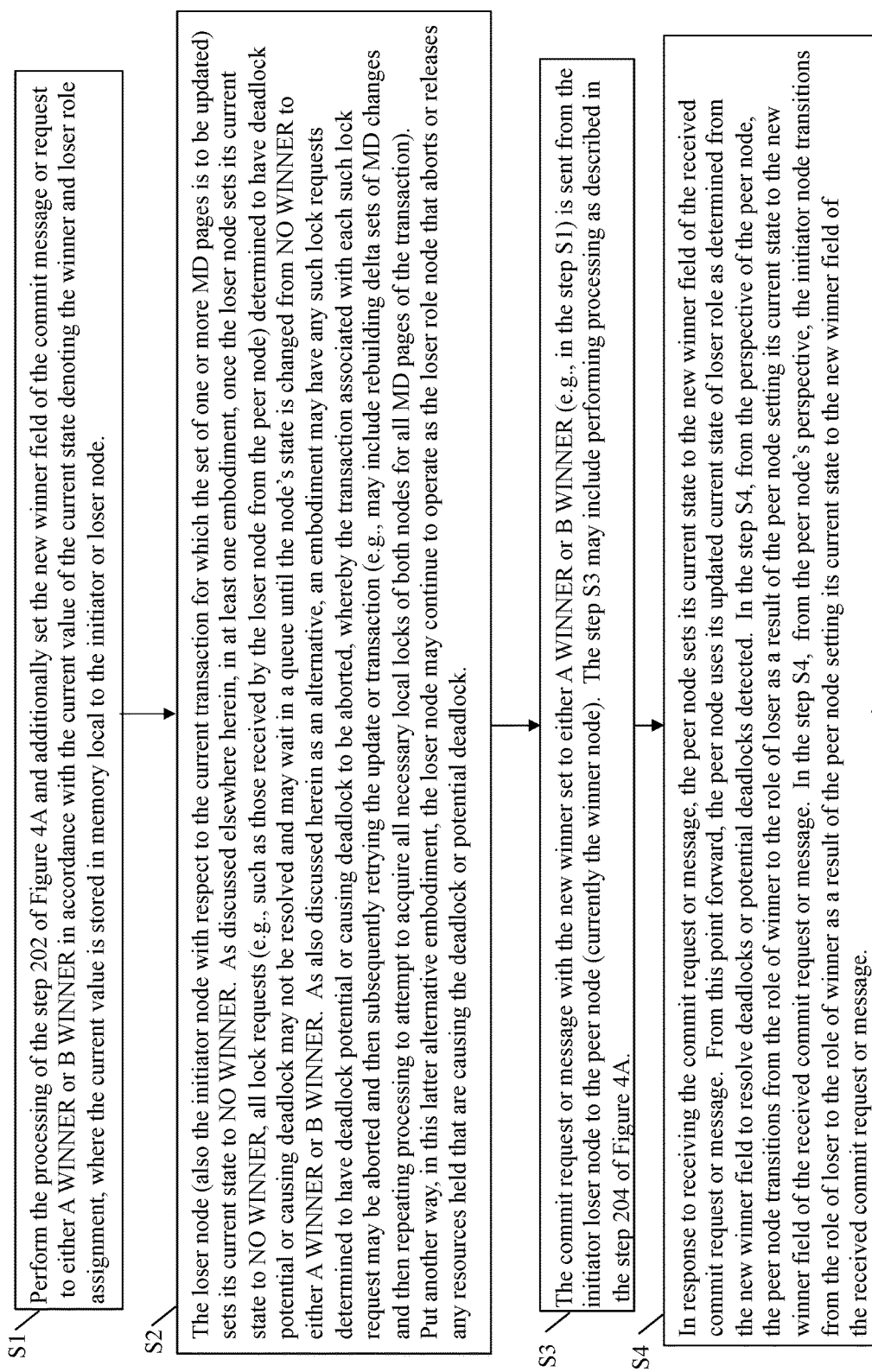

Referring to FIGS. 5A and 5B, shown is a flowchart of processing steps that may be performed in an embodiment in accordance with the techniques herein. The flowchart of FIGS. 5A and 5B generally describes the role switching processing or algorithm that may be performed in an embodiment in accordance with the techniques herein.

In a step S1, the loser node is an initiator node and needs to update a set of one or more MD pages such as described elsewhere herein, for example, in connection with FIGS. 4A and 4B. As discussed elsewhere herein, typically, the new winner field of the commit request or message sent in the step 204 of FIG. 4A may be NONE. However, upon the occurrence of a trigger condition in accordance with one or more policies as discussed elsewhere herein, processing may be performed to initiate the role switching processing or algorithm by an initiator node that is also currently assigned the role of loser. In this case, the loser node is initiating a transaction and needs to update the set of one or more MD page. When performing the processing of FIGS. 4A and 4B, the loser node as the initiator node sets the new winner field of the commit request or message in the step 204 to specify either A WINNER or B WINNER. The loser node as the initiator sets the new winner field to A WINNER if the current loser or initiator node is node A, and otherwise sets the new winner field to B WINNER if the current loser or initiator node is node B. The value of the current winner and thus the current loser at the current point in time when performing the step 204 may be based on the value of the current state (as stored on the initiator node) denoting the current role assignment. Thus, the loser node sets the new winner field to denote that the next winner role is assigned the identity (e.g., node A or node B) of the loser node itself, whereby the current loser node will transition to the role of winner. The value of the current state used in the step S1 may be stored in volatile memory that is local to the loser initiator node.

It is noted that the step S1 may generally denote performing the processing of the step 202 of FIG. 4A and additionally setting the new winner field of the commit message or request to either A WINNER or B WINNER in accordance with the current value of the current state denoting the winner and loser role assignment, where the current value is stored in memory local to the initiator or loser node. Following the step S1, control proceeds to the step S2.

At the step S2, the loser node (also the initiator node with respect to the current transaction for which the set of one or more MD pages is to be updated) updates its current state to NO WINNER. As discussed elsewhere herein, in at least one embodiment, once the loser node sets its current state to NO WINNER, all local lock requests (e.g., such as those received by the loser node from the other peer node as well as any requests initiated by the loser node) determined to have deadlock potential or causing deadlock may not be resolved and may wait in a queue until the loser node's state is changed from NO WINNER to either A WINNER or B WINNER. As also discussed herein as an alternative, an embodiment may have any such lock requests determined to have deadlock potential or causing deadlock to be aborted, whereby the transaction associated with each such lock request may be aborted and then subsequently retrying the update or transaction (e.g., may include rebuilding delta sets of MD changes and then repeating processing to attempt to acquire all necessary local locks of both nodes for all MD pages of the transaction). Put another way, in this latter alternative embodiment, the loser node may continue to operate as the loser role node that aborts or releases any resources held that are causing the deadlock or potential deadlock. From the step S2, control proceeds to the step S3.

In the step S3, the commit request or message with the new winner set to either A WINNER or B WINNER (e.g., in the step S1) is sent from the initiator loser node to the peer node (currently the winner node). The step S3 may include processing as described in the step 204 of FIG. 4A. From the step S3, control proceeds to the step S4. The step S4 may include processing as described in the step 206 of FIG. 4B.

In the step S4, in response to receiving the commit request or message, the peer node sets its current state to the new winner field of the received commit request or message. From this point forward, the peer node uses its updated current state of loser role as determined from the new winner field to resolve deadlocks or potential deadlocks it detects. In the step S4, from the perspective of the peer node, the peer node transitions from the role of winner to the role of loser as a result of the peer node setting its current state to the new winner field of the received commit request or message. In the step S4, from the peer node's perspective, the initiator node transitions from the role of loser to the role of winner as a result of the peer node setting its current state to the new winner field of the received commit request or message. From the step S4, control proceeds to the step S5.

At the step S5, the peer node completes processing for the commit request or message such as described in connection with the FIGS. 4A and 4B and returns a reply to the initiator node (e.g., in the step 214 of FIG. 4A). Following the step S5, is the step S6 which includes performing processing as described in the step 216 of FIG. 4B).

At the step S6, the initiator node (still having the loser node role) updates its current state according to the new winner field (e.g., either A WINNER or B WINNER) of the commit request or message it previously sent in the step S3. At this point from the initiator node's perspective, subsequent to updating the current state of the initiator node according to the new winner field, the initiator node's role is transitioned to the new winner role, where the initiator node may now resolve deadlocks or potential deadlocks according to the new winner role assigned to the initiator node and the new loser role assigned to the peer node. From the step S6, control proceeds to the step S7.

In the step S7, processing is performed in connection with all conflicting local lock requests of detected potential deadlock or deadlock that were placed on the wait queue in the step S2, where such conflicting local lock requests relate to detected deadlock conditions that occurred when the initiator node's state was NO WINNER. In the step S7, all such lock requests may now be processed and resolved according to the new updated node role of winner assigned to the initiator node and the new updated node role of loser assigned to the peer node. It should be noted that the probability of having any queued conflicting local lock requests that are awaiting deadlock resolution in the step S7 may be very small. Such conflicting local lock requests on the wait queue are associated with potential deadlock or deadlock conditions detected during a typically very small window of time when the winner and loser role assignment switch is in progress. In this manner, performing the techniques herein is efficient and has negligible impact on performance.

The foregoing role switching processing or algorithm guarantees coherent loser and winner role updates across the nodes of each appliance and cluster while avoiding race conditions. The foregoing role switching processing or algorithm therefore provides for balancing the winner assignments between the nodes of a dual node appliance. The foregoing role switching and assignment processing such as described in connection with FIGS. 5A and 5B may initiate the request by a current loser without introducing any additional round of message exchanges between the nodes currently performing the protocol and processing of FIGS. 4A and 4B. The techniques herein provide for initiating the switching of the winner and loser roles using the algorithm described herein by adding an additional field to an existing message exchanged between the nodes. Furthermore, in contrast to at least one other existing technique as described above, the foregoing role switching processing or algorithm minimizes the negative impacts of problems caused by a dedicated fixed winner role assignment to a single node. The NO WINNER state may be used to denote that the current state change with respect to the roles of loser and winner is in progress, and to postpone or delay performing deadlock resolution processing until the role switching assignment of winner and loser has completed. In at least one embodiment when in the NO WINNER STATE, the initiator node does not perform deadlock resolution and may rather wait to perform any needed resolution of detected potential deadlocks or deadlocks until both nodes have transitioned to a new winner state, where both nodes have the same updated consistent view with of role assignments of winner and loser among the two nodes. The NO WINNER state is used to avoid the problematic inconsistent view of role assignment among the two nodes where first node indicates node A is the winner and a second node that indicates node B is the winner.

For illustration purposes, the foregoing role switching processing or algorithm is described above with reference to the particular protocol described in connection with FIGS. 4A and 4B as described in more detail in the '252 application. More generally, the techniques herein may be used in connection with any detected deadlock or potential deadlock and any suitable protocol with one or more phases or messages exchanges between the two nodes. For example, another second protocol by which an initiator node may update MD pages for a transaction may include performing three message exchanges or phases by performing the following steps in sequential order:

1) Acquire the local locks of the initiator node for the MD pages of a transaction.

2) The initiator node sends a first request to the peer node to acquire the local locks of the peer node for the MD pages of the transaction.

3) The peer node receives the first message. In response, processing is performed on the peer node to acquire the requested local locks of the peer node for the MD pages of the transaction and then return a reply or response to the initiator acknowledging successful completion of the first request.

4) The initiator node sends a second request to the peer node with the updates to be made to the MD pages for the transaction.

5) The peer node receives the second request. In response, the peer node persistently updates the MD pages in accordance with the received updates of the second request; and the peer node updates its volatile memory copy of the MD pages in accordance with the received updates of the second request.

6) The peer node returns a response or reply to the initiator acknowledging successful completion of the second request.

7) In response to receiving the response or reply for the second request, the initiator updates its volatile memory copy of the MD pages in accordance with the received updates for the MD pages and releases its local locks for the MD pages (e.g., release the local locks of the initiator acquired in 1).

8) The initiator node sends a third request to the peer node requesting that the peer node release the local locks of the peer node for the MD pages previously acquired in 3).

9) The peer node receives the request, releases the locks on the MD pages, and returns a response or reply to the initiator acknowledging successful completion of the third request.

It is straight forward to adapt the above-noted role switching processing or algorithm as described in connection with FIGS. 5A and 5B for use with the above-noted second protocol to resolve detected deadlocks or potential deadlocks. For example, in the second protocol above, the new winner field may be added as a field to the second request sent in the step 4) of the second protocol. In connection with a local lock requested by the initiator node using the first message in the second protocol, if the requested local lock for a MD page is not available and is currently held by a node in connection with another transaction, processing for the request by the initiator may be blocked and wait in a queue associated with the local lock. In at least one embodiment, if there are multiple requests for multiple transactions blocked and waiting for the local lock, the multiple requests may be placed in the queue in a FIFO (first in first out) order in accordance with the time order in which the multiple requests attempted to acquire the local lock. In response to releasing the local lock, a next waiting request, if any, from the queue may proceed to attempt to acquire the local lock for the transaction associated with the next waiting request. For example, such a queue as just described may be used in connection each local lock of an initiator node when attempting to acquire its own one or more local locks for one or more MD pages of the transaction in the step 1) of the second protocol. Additionally, such a queue as just described may be used in connection each local lock of a peer node when attempting to acquire, on behalf of the commit requested from the initiator node for a transaction, one or more local locks of the peer node for one or more MD pages of the transaction in the step 3) of the second protocol.

In connection with the step 3) of the second protocol, the peer node may detect a potential deadlock if A) the initiator node is requesting a first local lock of the peer node for a first MD page that is already taken or held such as by the peer node itself for another transaction; and B) the peer node (when operating as an initiator for another transaction) has an outstanding request for a second local lock of the initiator node for the same first MD page. In other words, the peer node is waiting to acquire the second local lock of the initiator node for the first MD page and the initiator node currently holds second local lock in connection with another transaction; and the initiator node is waiting the acquire the first local lock of the peer node for the first MD page and the peer node currently holds the first local lock in connection with another transaction. Thus, the peer node may use its current value of its current state denoting the current assignment of the winner and loser roles to resolve the deadlock or potential deadlock.

For example, as a first scenario in the step 3) of the second protocol, assume the peer node's state is NO WINNER. In this first scenario, the initiator request for the first local lock of the peer node may be held and placed on a waiting queue where the request waits to be processed once the peer node's state is either A WINNER or B WINNER.

As another example, consider a second scenario in the step 3) of the second protocol. Assume the peer node's state indicates that the initiator node is the winner and the peer node is the loser. With the initiator as the winner, the initiator node's transaction proceeds and the loser's transaction is aborted while also releasing any acquired local locks for MD pages. Thus, as the winner, the initiator node's request for the conflicting first local lock of the peer node may proceed and wait on the queue associated with conflicting first local lock to await the release of the conflicting first local lock by the loser, the peer node. In connection with the outstanding request for the second local lock of the initiator node, the peer node as the loser may abort its conflicting transaction and release the first local lock of the peer node in connection with generally releasing all locks held or acquired for its conflicting transaction causing the detected potential deadlock due to the conflicting first local lock of the peer node. In response to releasing the first local lock of the peer node, the initiator node may be removed from the wait queue of the first local lock of the peer node, and then acquire the first local lock of the peer node. The loser peer node may subsequently retry the updates and the aborted transaction. More generally the techniques described herein may be applied for use in connection with any detected deadlock or potential deadlock in connection with any existing protocol having at least one message exchange.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A computer implemented method comprising:
performing first processing that includes role switching of a winner role and a loser role between a first node and a second node, wherein the winner role and the loser role are used in connection with resolving detected deadlocks or potential deadlocks, wherein prior to performing said first processing, the first node has the loser role and the second node has the winner role, wherein said first processing includes:
the first node updating a first current state of the first node from a value, denoting that the first node has the loser role and the second node has the winner role, to a first value indicating a "no winner" state and that role switching of the winner role and the loser role is in progress;
detecting at a first point in time, by the first node while the first current state of the first node has the first value indicating the "no winner" state, a deadlock or potential deadlock between the first node performing processing for a first transaction and the second node performing processing for a second transaction;
responsive to said detecting at the first point in time, by the first node while the first current state of the first node has the first value indicating the "no winner" state, the deadlock or potential deadlock between the first node and the second node, waiting to perform deadlock resolution processing in accordance with the loser role and the winner role to resolve the deadlock or potential deadlock detected in said detecting by the first node by placing a first conflicting lock request between the first transaction and the second transaction on a first queue until a second point in time when the first current state of the first node has been further updated by the first processing from the first value to a second value, wherein the first value indicates the "no winner" state, and wherein the first current state of the first node having the second value indicates that the first node has the winner role and that the second node has the loser role;
while the first current state of the first node as updated by said updating has the first value denoting the "no winner" state and subsequent to said waiting to perform deadlock resolution processing to resolve the deadlock or potential deadlock detected, the first node sending to the second node a new winner value indicating that the first node is transitioning from the loser role to the winner role and also indicating that the second node is transitioning from the winner role to the loser role;

responsive to the second node receiving the new winner value from the first node, the second node updating a second current state of the second node to the second value in accordance with the new winner value, where the second value of the second current state after updating by the second node indicates that the first node has the winner role and the second node has the loser role;

subsequent to the second node updating the second current state to the second value, the second node sending a reply to the first node; and in response to the first node receiving the reply from the second node, the first node updating, at the second point in time, the first current state of the first node from the first value indicating the "no winner" state to the second value indicating that the first node has the winner role and the second node has the loser role.

2. The method of claim 1, wherein, at any point in time, the first current state is one of three predetermined states and the second current state is one of the three predetermined states.

3. The method of claim 2, wherein the three predetermined states include a first predetermined state indicating the second value.

4. The method of claim 3, wherein the three predetermined states include a second predetermined state indicating that the second node is assigned the winner role and the first node is assigned the loser role.

5. The method of claim 4, wherein the first value of the first current state of the first node, denoting the "no winner" state, is a third predetermined state of the three predetermined states.

6. The method of claim 5, wherein, responsive to the first current state transitioning from the first value denoting the third predetermined state to the second value, using the first current state of the first node having the second value to perform said deadlock resolution processing to resolve the deadlock or potential deadlock detected by the first node.

7. The method of claim 1, wherein servicing each of the first transaction and the second transaction includes updating a set of one or more metadata (MD) pages.

8. The method of claim 7, wherein servicing the first transaction includes acquiring exclusive access to a first MD page and wherein said servicing the first transaction includes:

acquiring a first local lock of the first node for a first MD page; and acquiring a second local lock of the second node for the first MD page.

9. The method of claim 8, wherein servicing the second transaction includes acquiring exclusive access to the first MD page and wherein said servicing the second transaction includes:

acquiring the first local lock of the first node for the first MD page; and acquiring the second local lock of the second node for the first MD page.

10. The method of claim 9, wherein at a particular point in time, the first local lock of the first node for the first MD page is held by the first node, the second local lock of the second node for the first MD page is held by the second node, the second node has requested but not yet acquired the first local lock of the first node for the first MD page, and the first node has requested but not yet acquired the second local lock of the second node for the first MD page.

11. The method of claim 10, wherein the first node detects said deadlock or said potential deadlock at the particular point in time in response to the first node receiving a request from the second node for the first local lock of the first node for the first MD page while the first node holds the first local lock for the first MD page and while the first node also has an outstanding request for the second local lock of the second node for the first MD page.

12. The method of claim 1, wherein role switching is performed in accordance with one or more policies and is initiated by the first node when it is assigned the loser role and wherein the first node is an initiator servicing the first transaction.

13. The method of claim 12, wherein the one or more policies includes a first policy indicating to periodically perform role switching to switch roles and alternate assignment of the winner role and the loser role between the first node and the second node.

14. The method of claim 13, wherein the first policy indicates to perform role switching, that switches roles and alternates assignment of the winner role and the loser role between the first node and the second node, at each occurrence of a defined time interval.

15. The method of claim 13, wherein the first policy indicates to perform role switching of the winner role and the loser role between the first node and the second node each time a specified number of transactions is processed collectively by the first node and the second node.

16. The method of claim 13, wherein role switching of the winner role and the loser role between the first node and the second node is initiated periodically, at each of a plurality of points in time, by a particular one of the first node and the second node that is, at a point in time of the plurality of points in time, i) assigned the loser role and ii) an initiator that needs to update a set of one or more metadata pages for a particular transaction.

17. The method of claim 1, wherein subsequent to the second node updating the second current state to the second value and while the first current state of the first node has the first value denoting the "no winner" state, the second node performs other processing including:

the second node detecting a second deadlock or potential deadlock between a third transaction of the first node and a fourth transaction of the second node; and responsive to detecting the second deadlock or potential deadlock, the second node resolving the second deadlock or potential deadlock in accordance with the second current state that indicates the first node is assigned the winner role and the second node is assigned the loser role.

18. A system comprising:

one or more processors; and one or more memories comprising code stored thereon that, when executed, performs a method of comprising:

performing first processing that includes role switching of a winner role and a loser role between a first node and a second node, wherein the winner role and the loser role are used in connection with resolving detected deadlocks or potential deadlocks, wherein prior to performing said first processing, the first node has the loser role and the second node has the winner role, wherein said first processing includes:

the first node updating a first current state of the first node from a value, denoting that the first node has the loser role and the second node has the winner role, to a first value indicating a "no winner" state and that role switching of the winner role and the loser role is in progress;

detecting at a first point in time, by the first node while the first current state of the first node has the first value indicating the "no winner" state, a deadlock or potential deadlock between the first node performing processing for a first transaction and the second node performing processing for a second transaction;

responsive to said detecting at the first point in time, by the first node while the first current state of the first node has the first value indicating the "no winner" state, the deadlock or potential deadlock between the first node and the second node, waiting to perform deadlock resolution processing in accordance with the loser role and the winner role to resolve the deadlock or potential deadlock detected in said detecting by the first node by placing a first conflicting lock request between the first transaction and the second transaction on a first queue until a second point in time when the first current state of the first node has been further updated by the first processing from the first value to a second value, wherein the first value indicates the "no winner" state, and wherein the first current state of the first node having the second value indicates that the first node has the winner role and that the second node has the loser role;

while the first current state of the first node as updated by said updating has the first value denoting the "no winner" state and subsequent to said waiting to perform deadlock resolution processing to resolve the deadlock or potential deadlock detected, the first node sending to the second node a new winner value indicating that the first node is transitioning from the loser role to the winner role and also indicating that the second node is transitioning from the winner role to the loser role;

responsive to the second node receiving the new winner value from the first node, the second node updating a second current state of the second node to the second value in accordance with the new winner value, where the second value of the second current state after updating by the second node indicates that the first node has the winner role and the second node has the loser role;

subsequent to the second node updating the second current state to the second value, the second node sending a reply to the first node; and in response to the first node receiving the reply from the second node, the first node updating, at the second point in time, the first current state of the first node from the first value indicating the "no winner" state to the second value indicating that the first node has the winner role and the second node has the loser role.

19. A non-transitory computer readable medium comprising code stored thereon that, when executed, performs a method comprising:

performing first processing that includes role switching of a winner role and a loser role between a first node and a second node, wherein the winner role and the loser role are used in connection with resolving detected deadlocks or potential deadlocks, wherein prior to performing said first processing, the first node has the loser role and the second node has the winner role, wherein said first processing includes:

the first node updating a first current state of the first node from a value, denoting that the first node has the loser role and the second node has the winner role, to a first value indicating a "no winner" state and that role switching of the winner role and the loser role is in progress;

detecting at a first point in time, by the first node while the first current state of the first node has the first value indicating the "no winner" state, a deadlock or potential deadlock between the first node performing processing for a first transaction and the second node performing processing for a second transaction;

responsive to said detecting at the first point in time, by the first node while the first current state of the first node has the first value indicating the "no winner" state, the deadlock or potential deadlock between the first node and the second node, waiting to perform deadlock resolution processing in accordance with the loser role and the winner role to resolve the deadlock or potential deadlock detected in said detecting by the first node by placing a first conflicting lock request between the first transaction and the second transaction on a first queue until a second point in time when the first current state of the first node has been further updated by the first processing from the first value to a second value, wherein the first value indicates the "no winner" state, and wherein the first current state of the first node having the second value indicates that the first node has the winner role and that the second node has the loser role;

while the first current state of the first node as updated by said updating has the first value denoting the "no winner" state and subsequent to said waiting to perform deadlock resolution processing to resolve the deadlock or potential deadlock detected, the first node sending to the second node a new winner value indicating that the first node is transitioning from the loser role to the winner role and also indicating that the second node is transitioning from the winner role to the loser role;

responsive to the second node receiving the new winner value from the first node, the second node updating a second current state of the second node to the second value in accordance with the new winner value, where the second value of the second current state after updating by the second node indicates that the first node has the winner role and the second node has the loser role;

subsequent to the second node updating the second current state to the second value, the second node sending a reply to the first node; and in response to the first node receiving the reply from the second node, the first node updating, at the second point in time, the first current state of the first node from the first value indicating the "no winner" state to the second value indicating that the first node has the winner role and the second node has the loser role.

* * * * *